United States Patent [19]
Kühnlein

[11] 3,872,910
[45] Mar. 25, 1975

[54] METHOD OF CONCENTRATING CAUSTIC SOLUTIONS

[75] Inventor: Hans Kühnlein, Fellinsdorf, Switzerland

[73] Assignee: HCH. Bertrams Aktiengesellschaft, Basel, Switzerland

[22] Filed: Sept. 12, 1973

[21] Appl. No.: 396,361

Related U.S. Application Data

[63] Continuation of Ser. No. 111,183, Feb. 1, 1971, abandoned.

[30] Foreign Application Priority Data

Feb. 4, 1970 Switzerland.......................... 1623/70

[52] U.S. Cl.............. 159/49, 159/13 R, 159/17 VS, 159/DIG. 32
[51] Int. Cl............................................... B01d 1/22
[58] Field of Search........ 159/2, 47, 99, 13 A, 13 B, 159/13 BR, DIG. 16, 17 VS, 27 D, DIG. 32; 23/306, 184, 274, 276; 203/12; 202/173, 174; 423/183, 641, 642, 643

[56] References Cited
UNITED STATES PATENTS

| | | | |
|---|---|---|---|
| 521,974 | 6/1894 | Cooper | 159/2 |
| 1,215,140 | 2/1917 | Giller | 159/2 R |
| 1,438,502 | 12/1922 | Peebles | 159/2 R |
| 2,562,495 | 7/1951 | Hulme | 23/184 |
| 2,573,516 | 10/1951 | Van Der Molen | 159/2 |
| 2,610,105 | 9/1952 | Pye | 23/184 |
| 3,131,110 | 4/1964 | Duval | 203/12 |
| 3,354,932 | 11/1967 | Hesler et al. | 159/13 A |
| 3,467,162 | 9/1969 | Putnam | 23/306 |
| 3,630,262 | 12/1971 | Macek | 159/2 R |

FOREIGN PATENTS OR APPLICATIONS 144,287   2/1904   Germany .............................. 159/2

*Primary Examiner*—A. Louis Monacell
*Assistant Examiner*—David Edwards
*Attorney, Agent, or Firm*—McGlew & Tuttle

[57] ABSTRACT

Caustic solutions, such as lyes, are heated under atmospheric pressure to produce a hot concentrate which is expanded in a vacuum while simultaneously being cooled to a temperature which is still above the crystallization temperature. The apparatus comprises a heated evaporator working at atmospheric pressure and arranged ahead of an unheated vacuum evaporator. The heated evaporator preferably is a tubular heat exchanger with a fused salt bath as the heat carrier, ahead of which can be arranged a falling film type of heat exchanger which is heated by the vapors from the fused salt bath heated exchanger.

3 Claims, 1 Drawing Figure

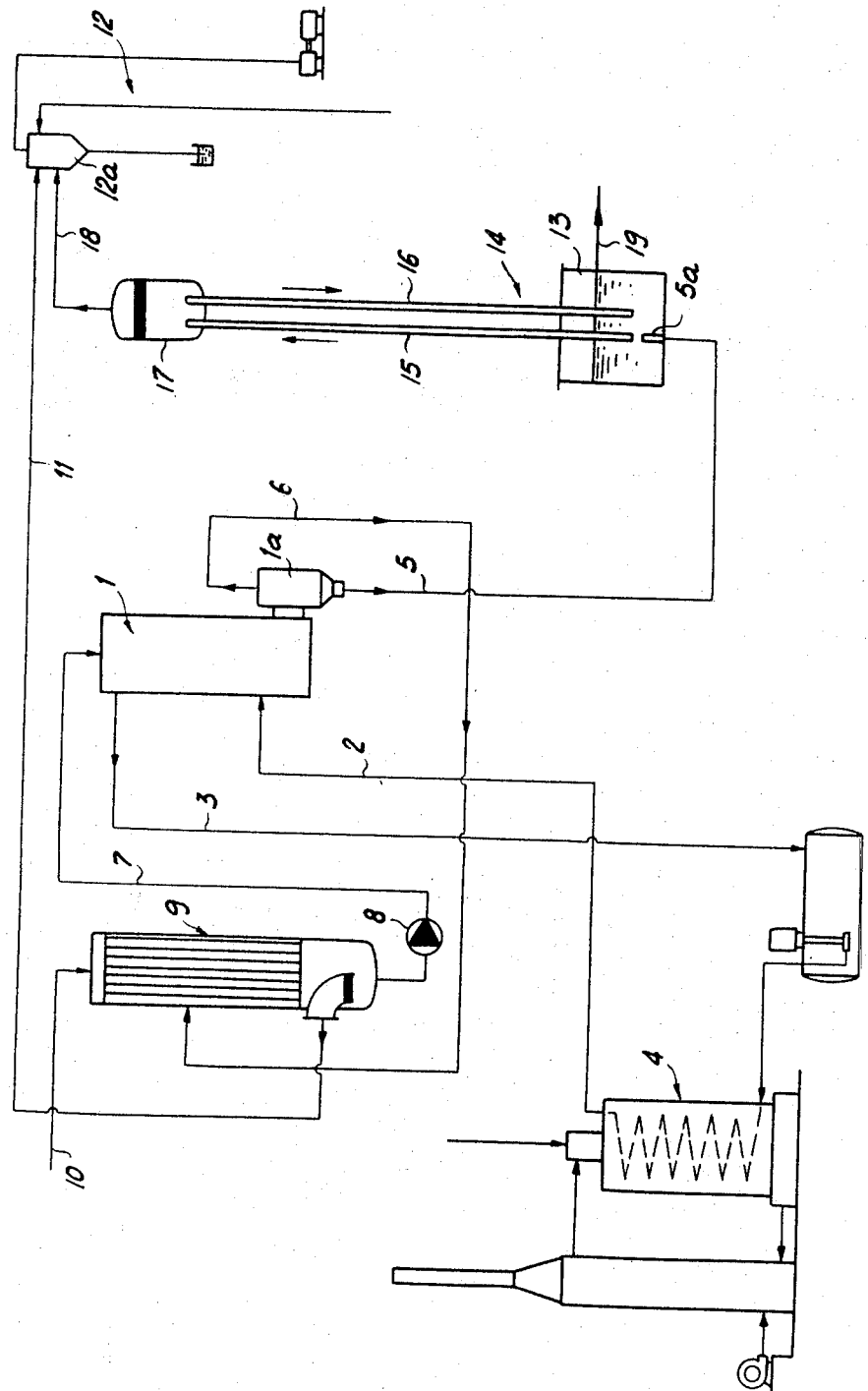

3,872,910

METHOD OF CONCENTRATING CAUSTIC SOLUTIONS

This is a streamline continuation of application Ser. No. 111,183 filed Feb. 1, 1971, and now abandoned

BACKGROUND OF THE INVENTION

Fifty percent sodium hydroxide (NaOH) solutions are evaporated, in presently known concentration plants with tubular evaporators, either under a vacuum to 99.8% NaOH, or in directly heated vessels, under normal presssure, to the same end concentration. The Bertrams concentration plant, using tubular elements and fused salt bath heating is also known. In this arrangement, a preliminary evaporation, which concentrates the solutions from 50 to 62%, can be added, this preliminary evaporation being effected by heating by the vapors (evaporated water from the solution) formed during the final concentration. By this means, it is possible to reduce the heat consumption during the dehydration of the NaOH solution by 28%. Similar conditions pertain for the concentration of KOH solutions.

All known concentration plants which work under atmospheric pressure have the disadvantage that the dehydrated melt, issuing from the plant, has temperatures which are substantially above the crystallization point. Corresponding cooling of the melt, prior to the crystallization, on a scaling machine or in a casting machine, thus is necessary.

On the other hand, the above-described evaporators, which work under a vacuum and where the dehydrated melt leaves the evaporators at a temperature which is only slightly above the crystallization point, do not utilize the vapors, since they have too low a pressure and can no longer be used.

SUMMARY OF THE INVENTION

This invention relates to the concentration of caustic solutions such as lyes and, more particularly, to a novel and improved method and apparatus for effecting such concentration and which avoids the disadvantages of prior art procedures.

For this purpose, the invention method is characterized by the fact that a hot solution, concentrated by heating under atmospheric pressure, is subsequently expanded in a vacuum and, at the same time, cooled to a temperature which is still above the crystallization point.

The expansion of the hot melt, which has been concentrated under atmospheric pressure, in the vacuum thus effects not only an additional concentration, which can go up to 100%, for example, but also effects cooling of the melt. By corresponding selection of the end temperature in the heated evaporator, and of the underpressure in the vacuum evaporator, the end concentrate can be brought to the desired end temperature which is about 10 to 30°C. above the crystallization point, for example. It has also been found that gas inclusions in the melt, which can be formed, for example, by reagents, are expelled by the vacuum evaporation so that a completely clear and qualitatively high grade liquor concentrate can be produced.

The apparatus for performing this method, which is also the subject matter of the invention, includes a heated evaporator working at atmospheric pressure and behind which there is arranged an unheated vacuum evaporator. Preferably, the heated evaporator is a tubular heat exchanger with a fused salt bath as a heat carrier, and ahead of which there can be arranged a falling or descending film type of heat exchanger which is heated by the vapors from the fused salt bath heated exchanger.

An object of the invention is to provide an improved method for concentrating caustic solutions, such as lyes.

Another object of the invention is to provide an improved apparatus for practicing the method.

A further object of the invention is to provide such a method and apparatus by which the concentration may be effected up to any desired amount, such as 100%, for example.

Another object of the invention is to provide such a method and apparatus in which gas inclusions in the melt are expelled during vacuum evaporation so that a completely clear and qualitatively high grade liquor concentrate is produced.

For an understanding of the principles of the invention, reference is made to the following description of a typical embodiment thereof as illustrated in the accompanying drawing.

BRIEF DESCRIPTION OF THE DRAWING

In the drawing, the single FIGURE is a schematic representation of apparatus embodying the invention as used in performing the method of the invention.

DESCRIPTION OF THE PREFERRED EMBODIMENT

Referring to the drawing, a tubular heat exchanger 1 has its heating jacket connected by feed or supply pipe 2 and discharge or return pipe 3 to a fused salt bath generator 4. In association with heat exchanger 1, there is a separator 1a to which are connected a discharge pipe 5, for the concentrate, and a discharge pipe 6, for the vapors produced. The liquor feed pipe to the fused salt bath heated tubular heat exchanger 1 is indicated at 7 as connected to the outlet of a pump 8 whose inlet is connected to the concentrate outlet of a falling film type heat exchanger 9. Pipe 6, serving as a heat-carrier pipe, is also connected to heat exchanger 9.

Liquor is fed or supplied to heat exchanger 9 through a pipe 10. Heat exchanger 9 works with negative or less than atmospheric pressure and, for this purpose, is connected by a suction pipe 11 to the vacuum chamber 12a of a vacuum generator 12.

Concentrate discharge pipe 5 of fused salt bath heated heat exchanger 1 is connected to a collecting tank 13 of an unheated vacuum evaporator 14, in a manner such that the discharge end 5a of pipe 5 points upwardly and is spaced a short distance beneath the bottom opening of a vertical uptake 15 dipping into tank 13. A barometer tube 16 dips into tank 13 in laterally spaced parallel relation with uptake 15, and the upper ends of both tubes 15 and 16 extend into a vacuum chamber 17 connected by a pipe 18 to vacuum chamber 12a of vacuum generator 12. The apparatus just described is used, for example, for the concentration of NaOH solution, and its method of operation will now be described.

Fifty percent NaOH solution is fed to falling film evaporator 9 through inlet pipe 10, and a vacuum of 40 mm Hg is produced in evaporator 9 through pipe 11. At the same time, the hot vapors from evaporator 1, which serve as a heat carrier, are fed through pipe 6 to evaporator 9. The arrangement is such that the 50% NaOH solution is concentrated to 62% in evaporator 9. This 62% concentrate is fed by pump 8 to the fused salt bath heated tubular heat exchanger 1 working under atmospheric pressure and supplied with the fused salt bath heat carrier through pipes 2 and 3. The NaOH solution is heated by the heat supplied from the fused salt bath heating medium, to about 400 to 450°C., and is concentrated to about 90%. As mentioned above, the evaporated vapors are supplied through pipe 6 to evaporator 9 for the preliminary concentration of the solution. The hot concentrate is fed through pipe 5 to the collecting tank 13 which is connected to the unheated vacuum evaporator or chamber 17. A vacuum of 40 mm Hg is maintained in chamber 17 through pipe 18 connected to vacuum tank 12a, while the concentrate is fed to tank 13 under atmospheric pressure. The negative pressure or suction in uptake 15 has the effect that the concentrate, issuing from the discharge end 5a of pipe 5, arrives practically completely in uptake 15. Due to the pressure, which decreases toward the top of uptake 15 which is axially aligned with end 5a of pipe 5, vapor bubbles are formed in this uptake and carry the concentrate upwardly into vacuum chamber 17.

In chamber 17, the vapor phase is separated from the liquid phase, and the separated steam issues, together with the expelled gas impurities, through pipe 18, while the NaOH solution, which is concentrated to at least approximately 100%, drops through barometer tube 16 into tank 13 from which it is removed through pipe 19 of the apparatus. Since no additional heat is supplied to evaporator 14, the evaporation of the residual water from the solution, effected by the vacuum, effects a certain cooling of the solution. The arrangement is such that the end temperature of the concentrate is reduced to close to the crystallization point, in the present case to about 330 to 350°C.

The above-described method, where the principal concentration of the solution is effected under atmospheric pressure at relatively high temperatures, while the vapors obtained during the principal concentration are used for the preliminary concentration effected under vacuum, and a vacuum is used for the end concentration and for cooling, is not only very economical but it also yields a particularly pure, highly concentrated solution with a concentrated temperature only slightly above the crystallization point. This permits direct processing of the concentrate, for example, in a scaling machine or in an ingot casting machine.

Although it has been found expedient, in evaporators working under atmospheric pressure, to use a fused salt bath as a heat carrier another heating medium, for example a hot gas, can also be used. The use of a common tank for the immersion of the uptake and of the barometric tube of the vacuum evaporator permits a particularly simple construction. Since the vacuum is kept constant in chamber 17, density or conentration variations in the solution supply could lead to undesired changes in the delivery of the solution in the uptake. But since the uptake dips into the end concentrate arriving through barometer tube 16, more or less end concentrate is carried along into the uptake with varying suction in the uptake, so that the delivery in the uptake remains substantially constant. On the other hand, it naturally is possible to regulate the delivery in the uptake by the installation of a valve in uptake 15.

While a specific embodiment of the invention has been shown and described in detail to illustrate the application of the principals of the invention, it should be understood that the invention may be embodied otherwise without departing from such principles.

What is claimed is:

1. A method for concentrating caustic solutions comprising the steps of heating a caustic solution under atmospheric pressure to produce a hot caustic solution concentrate; separating the produced vapors from the hot concentrate and utilizing the separated vapors in heating of the caustic solution; then expanding the hot concentrate in a vacuum while simultaneously cooling the same to a temperature which is still above the crystallization temperature; and prior to heating the caustic solution under atmospheric pressure, subjecting the caustic solution to a preliminary concentration under vacuum in accordance with the falling film procedure and utilizing vapors developed during such heating of the caustic solution under atmospheric pressure.

2. A method for concentrating caustic solutions, as claimed in claim 1, in which the preliminary concentration and the final concentration, effected by such expansion, are effected by expansion at the same negative pressure.

3. A method for concentrating caustic solutions, as claimed in claim 2, in which the negative pressure utilized to expand the hot concentrate in a vacuum while simultaneously cooling the same is further utilized to discharge the hot concentrate for use.

* * * * *